United States Patent
Inoue et al.

(10) Patent No.: US 8,230,169 B2
(45) Date of Patent: Jul. 24, 2012

(54) ELECTRONIC APPARATUS, DISK SWITCHING METHOD AND COMPUTER PROGRAM

(75) Inventors: Kenichi Inoue, Kanagawa (JP); Hiroshi Hane, Tokyo (JP)

(73) Assignee: Sony Corporation (JP)

( * ) Notice: Subject to any disclaimer, the term of this patent is extended or adjusted under 35 U.S.C. 154(b) by 412 days.

(21) Appl. No.: 12/288,735

(22) Filed: Oct. 23, 2008

(65) Prior Publication Data
US 2009/0113125 A1    Apr. 30, 2009

(30) Foreign Application Priority Data
Oct. 26, 2007    (JP) .............................. P2007-279306

(51) Int. Cl.
G06F 13/00    (2006.01)
G06F 13/28    (2006.01)
G01K 1/08    (2006.01)

(52) U.S. Cl. ................ 711/112; 711/113; 711/E12.019; 702/132

(58) Field of Classification Search .................. None
See application file for complete search history.

(56) References Cited

U.S. PATENT DOCUMENTS
7,257,684 B1 * 8/2007 Sinha et al. ................... 711/154

FOREIGN PATENT DOCUMENTS
JP    2001092703 A    4/2001
JP    2002-258996 A    9/2002
JP    2002297431 A    10/2002

OTHER PUBLICATIONS
Office Action from Japanese Application No. 2007-279306, dated Jun. 6, 2012.

* cited by examiner

Primary Examiner — Kevin Verbrugge
Assistant Examiner — Eric S Cardwell
(74) Attorney, Agent, or Firm — Lerner, David, Littenberg, Krumholz & Mentlik, LLP

(57) ABSTRACT

There is provided an electronic apparatus including a plurality of hard disk drives having a standby state and an active state as power application state. The electronic apparatus includes a drive setting portion to set each of the plurality of hard disk drives to a cache hard disk drive or a storage hard disk drive so as to use one hard disk drive in the active state as a cache hard disk drive and use a remaining hard disk drive as a storage hard disk drive, and a power control portion to control application of power to each of the hard disk drives according to setting by the drive setting portion.

5 Claims, 8 Drawing Sheets

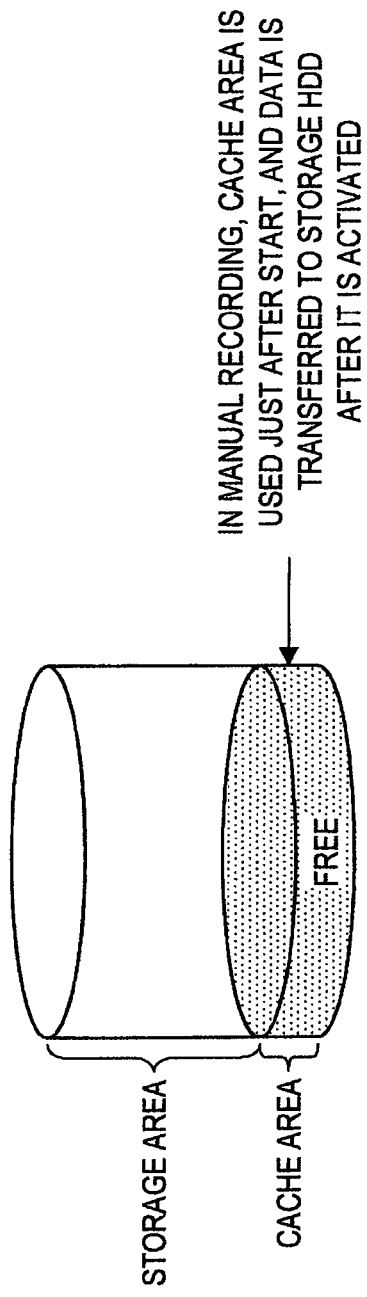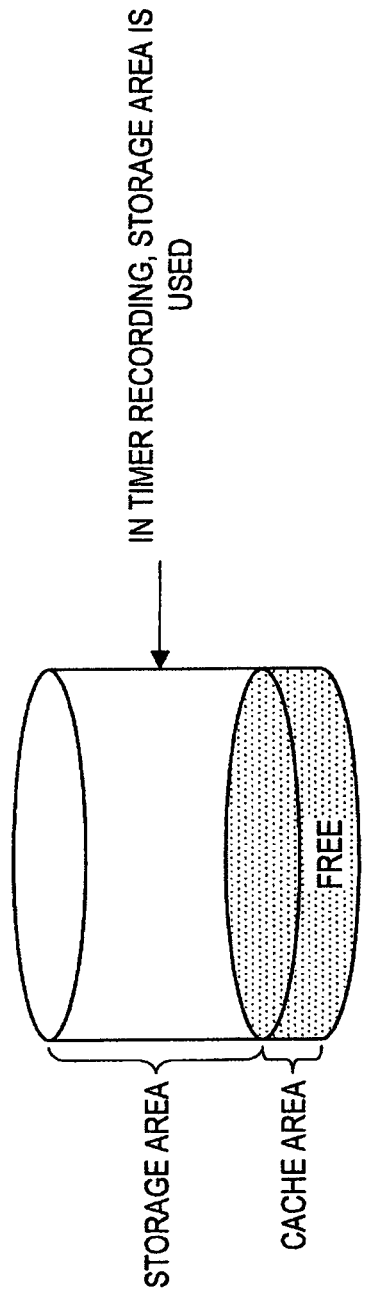

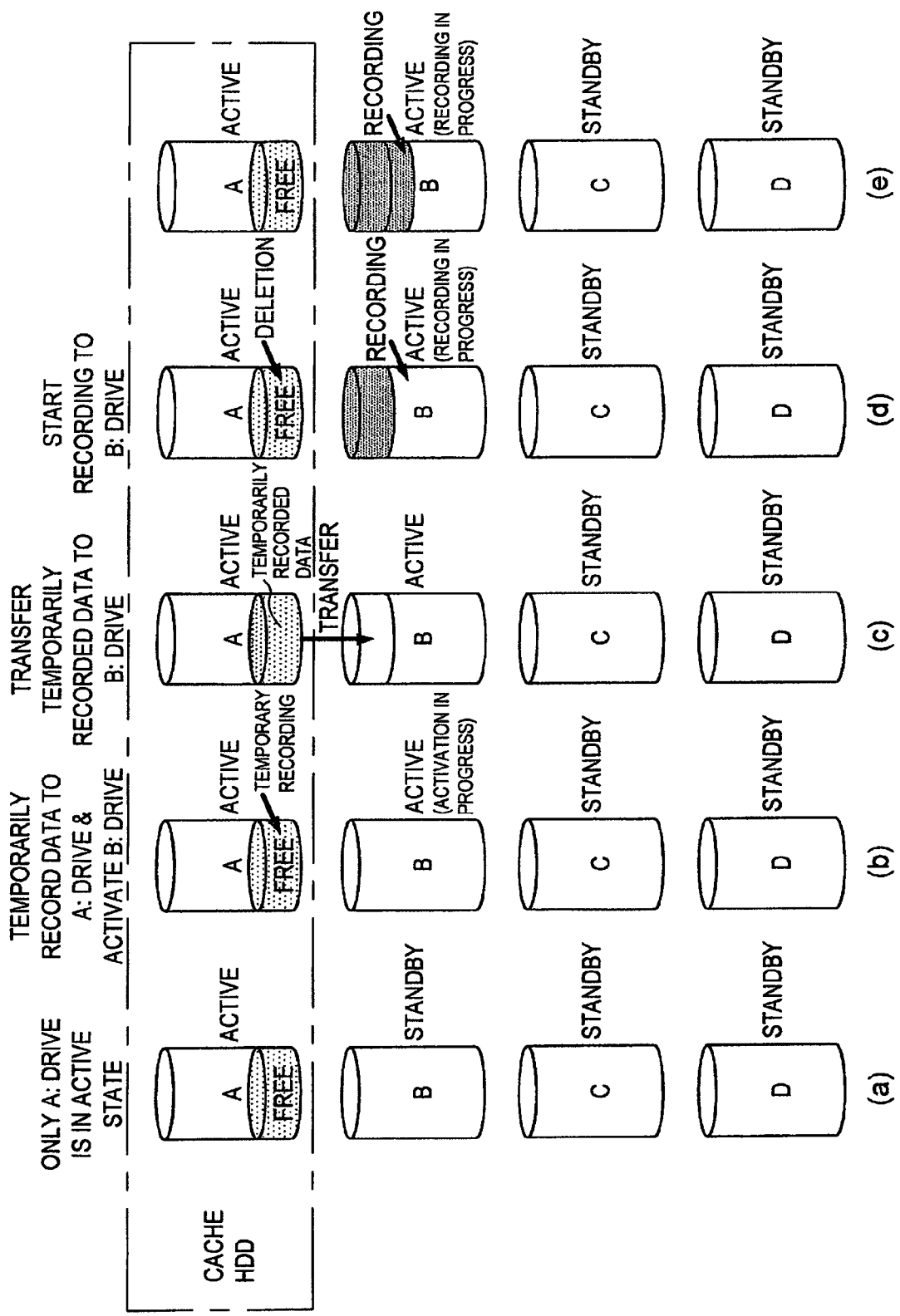

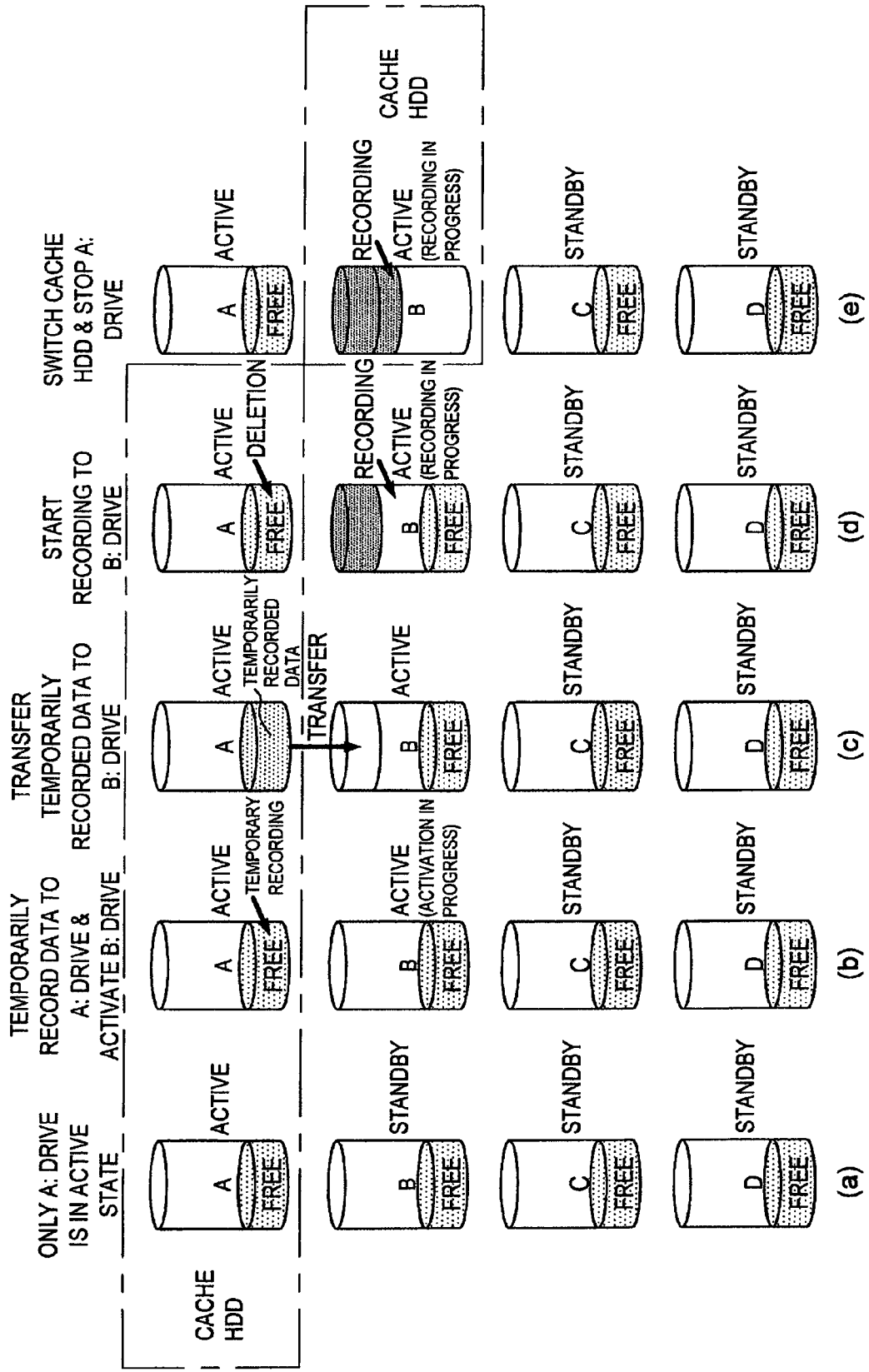

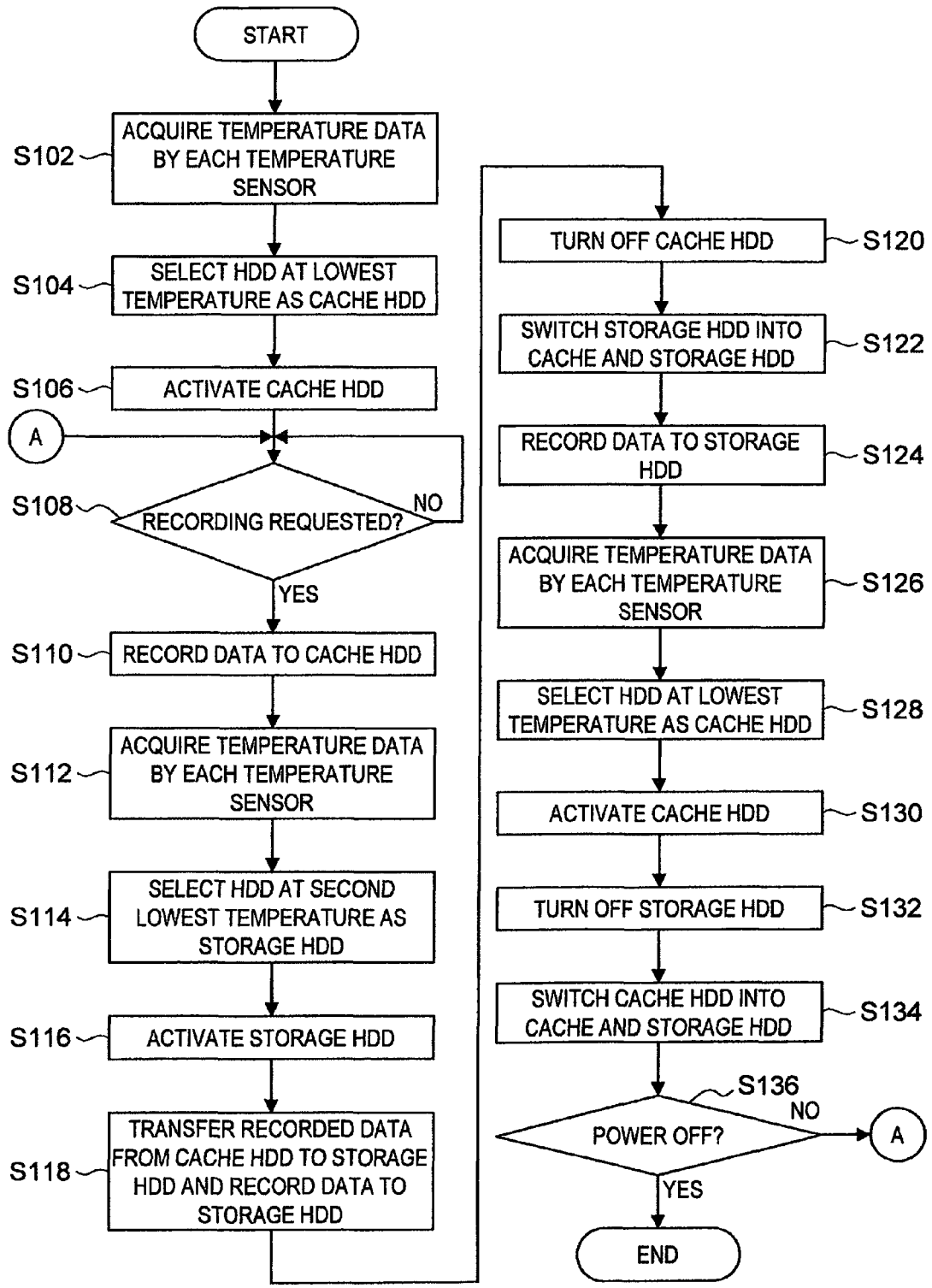

ELECTRONIC APPARATUS, DISK SWITCHING METHOD AND COMPUTER PROGRAM

CROSS-REFERENCE TO RELATED APPLICATION

The present application claims priority from Japanese Patent Application No. JP 2007-279306, filed in the Japanese Patent Office on Oct. 26, 2007, the entire content of which is incorporated herein by reference.

BACKGROUND OF THE INVENTION

1. Field of the Invention

The present invention relates to an electronic apparatus, a disk switching method and a computer program and, particularly, to an electronic apparatus including a plurality of hard disk drives and a disk switching method and a computer program in the electronic apparatus.

2. Description of the Related Art

As digitalization of TV programs progresses, a recording apparatus such as a hard disk recorder for recording a TV program or the like is expected to record a huge amount of data. An approach to deal with an increase in the amount of data to be recorded is to incorporate a plurality of hard disk drives into a recording apparatus so as to realize a larger capacity.

If a recording apparatus includes a plurality of hard disk drives, it is possible to use one hard disk drive as a cache hard disk drive and another as a storage hard disk drive. Thus, by making a cache hard disk drive run all the time, a time lag from pressing a recording button on a remote control or a main body of a recording apparatus to the start of recording can be reduced.

However, if a recording apparatus includes a plurality of hard disk drives, it causes issues such as noise, high power consumption and temperature increase. Therefore, it is necessary for a recording apparatus which includes a plurality of hard disk drives to ensure effective operation control of hard disk drives. A technique of reducing power consumption and noise of hard disk drives in an apparatus which includes a plurality of hard disk drives is disclosed in Japanese Unexamined Patent Application. Publication No. 2002-258996.

SUMMARY OF THE INVENTION

However, according to the technique disclosed in Japanese Unexamined Patent Application Publication No. 2002-258996, although a storage hard disk drive is turned on only upon storing data, a cache hard disk drive stays on all the time, and it is thus susceptible to improvement in terms noise and power consumption.

In light of the foregoing, it is desirable to provide a novel and improved recording apparatus which includes a plurality of hard disk drives and appropriately switches a storage hard disk drive and a cache hard disk drive to use, and a disk switching method and a computer program in the recording apparatus.

According to an embodiment of the present invention, there is provided an electronic apparatus including a plurality of hard disk drives having a standby state and an active state as power application state, which includes a drive setting portion to set each of the plurality of hard disk drives to a cache hard disk drive or a storage hard disk drive so as to use one hard disk drive in the active state as a cache hard disk drive and use a remaining hard disk drive as a storage hard disk drive, and a power control portion to control application of power to each of the hard disk drives according to setting by the drive setting portion.

In this configuration, the drive setting portion sets each of the plurality of hard disk drives to a cache hard disk drive or a storage hard disk drive so as to use one hard disk drive in the active state as a cache hard disk drive and use a remaining hard disk drive as a storage hard disk drive, and the power control portion controls application of power to each of the hard disk drives according to setting by the drive setting portion. Because it is only one hard disk drive that is in the active state, it is possible to implement effective operation control of hard disk drives with low power consumption.

The electronic apparatus may further include a temperature measuring portion to measure a temperature of each of the plurality of hard disk drives, and the drive setting portion may set a hard disk drive at the lowest temperature measured by the temperature measuring portion to a cache hard disk drive. In this configuration, the temperature measuring portion measures a temperature of each of the plurality of hard disk drives, and the drive setting portion sets a hard disk drive at the lowest temperature measured by the temperature measuring portion to a cache hard disk drive. It is thereby possible to suppress an increase in inside temperature in addition to power consumption.

The drive setting portion may set a hard disk drive at the lowest temperature measured by the temperature measuring portion to a cache hard disk drive upon completion of recording of data into a storage hard disk drive. In this configuration, the drive setting portion sets a hard disk drive at the lowest temperature measured by the temperature measuring portion to a cache hard disk drive upon completion of recording of data into a storage hard disk drive. Thus, by measuring a temperature at the time of completing recording of data into a storage hard disk drive and applying power to the hard disk drive at the lowest temperature as a cache hard disk drive, it is possible to suppress an increase in inside temperature.

According to another embodiment of the present invention, there is provided a disk switching method of an apparatus including a plurality of hard disk drives having a standby state and an active state as power application state, which includes the steps of setting each of the plurality of hard disk drives to a cache hard disk drive or a storage hard disk drive so as to use one hard disk drive in the active state as a cache hard disk drive and use a remaining hard disk drive as a storage hard disk drive, and controlling application of power to each of the hard disk drives according to setting in the setting step.

The disk switching method may further include the step of measuring a temperature of each of the plurality of hard disk drives, and the setting step may set a hard disk drive at the lowest temperature measured in the measuring step to a cache hard disk drive. In this method, the measuring step measures a temperature of each of the plurality of hard disk drives, and the setting step sets a hard disk drive at the lowest temperature measured in the measuring step to a cache hard disk drive. It is thereby possible to suppress an increase in inside temperature in addition to power consumption.

The setting step may set a hard disk drive at the lowest temperature measured in the measuring step to a cache hard disk drive upon completion of recording of data into a storage hard disk drive. In this method, the setting step sets a hard disk drive at the lowest temperature measured in the measuring step to a cache hard disk drive upon completion of recording of data into a storage hard disk drive. Thus, by measuring a temperature at the time of completing recording of data into a storage hard disk drive and applying power to the hard disk drive at the lowest temperature as a cache hard disk drive, it is possible to suppress an increase in inside temperature.

According to another embodiment of the present invention, there is provided a computer program for switching disks in an apparatus including a plurality of hard disk drives having a standby state and an active state as power application state, the computer program causing a computer to execute processing including setting each of the plurality of hard disk drives to a cache hard disk drive or a storage hard disk drive so as to use one hard disk drive in the active state as a cache hard disk drive and use a remaining hard disk drive as a storage hard disk drive, and controlling application of power to each of the hard disk drives according to setting in the setting step.

According to the embodiments of the present invention described above, there are provided an electronic apparatus which includes a plurality of hard disk drives and appropriately switches a storage hard disk drive and a cache hard disk drive to use, and a disk switching method and a computer program in the electronic apparatus. By appropriately switching a storage hard disk drive and a cache hard disk drive, it is possible to suppress noise, power consumption and temperature increase.

BRIEF DESCRIPTION OF THE DRAWINGS

FIG. 5A is an explanatory view showing the structure of a hard disk drive incorporated in the recording apparatus 10 according to one embodiment of the present invention.

FIG. 5B is an explanatory view showing the structure of a hard disk drive incorporated in the recording apparatus 10 according to one embodiment of the present invention.

FIG. 6A is an explanatory view showing a method of switching hard disk drives according a related art.

FIG. 6B is an explanatory view showing the outline of a method of switching hard disk drives using the recording apparatus 10 according to one embodiment of the present invention.

FIG. 7 is a flowchart showing a method of switching hard disk drives using the recording apparatus 10 according to one embodiment of the present invention.

DETAILED DESCRIPTION OF THE PREFERRED EMBODIMENTS

Figure 1:
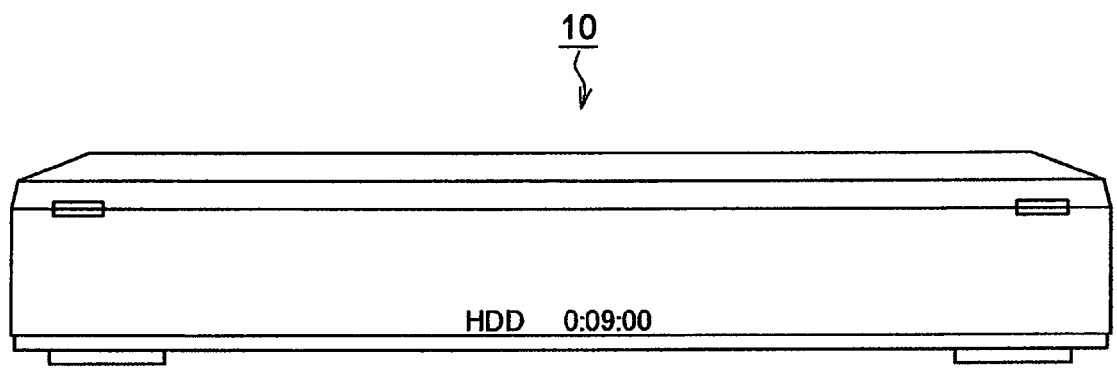
FIG. 1 is an explanatory view showing the appearance of a recording apparatus 10 according to one embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A recording apparatus according to one embodiment of the present invention is described hereinafter. FIG. 1 is an explanatory view showing the appearance of a recording apparatus 10 according to an embodiment of the present invention. The recording apparatus 10 according to the embodiment shown in FIG. 1 includes a plurality of hard disk drives to realize a larger capacity.

However, the inclusion of a plurality of hard disk drives causes issues such as noise, high power consumption and temperature increase. In light of this, the recording apparatus 10 according to the embodiment controls the operation of hard disk drives, thereby overcoming such issues. The recording apparatus 10 according to one embodiment of the present invention is described hereinafter in detail.

Figure 2:
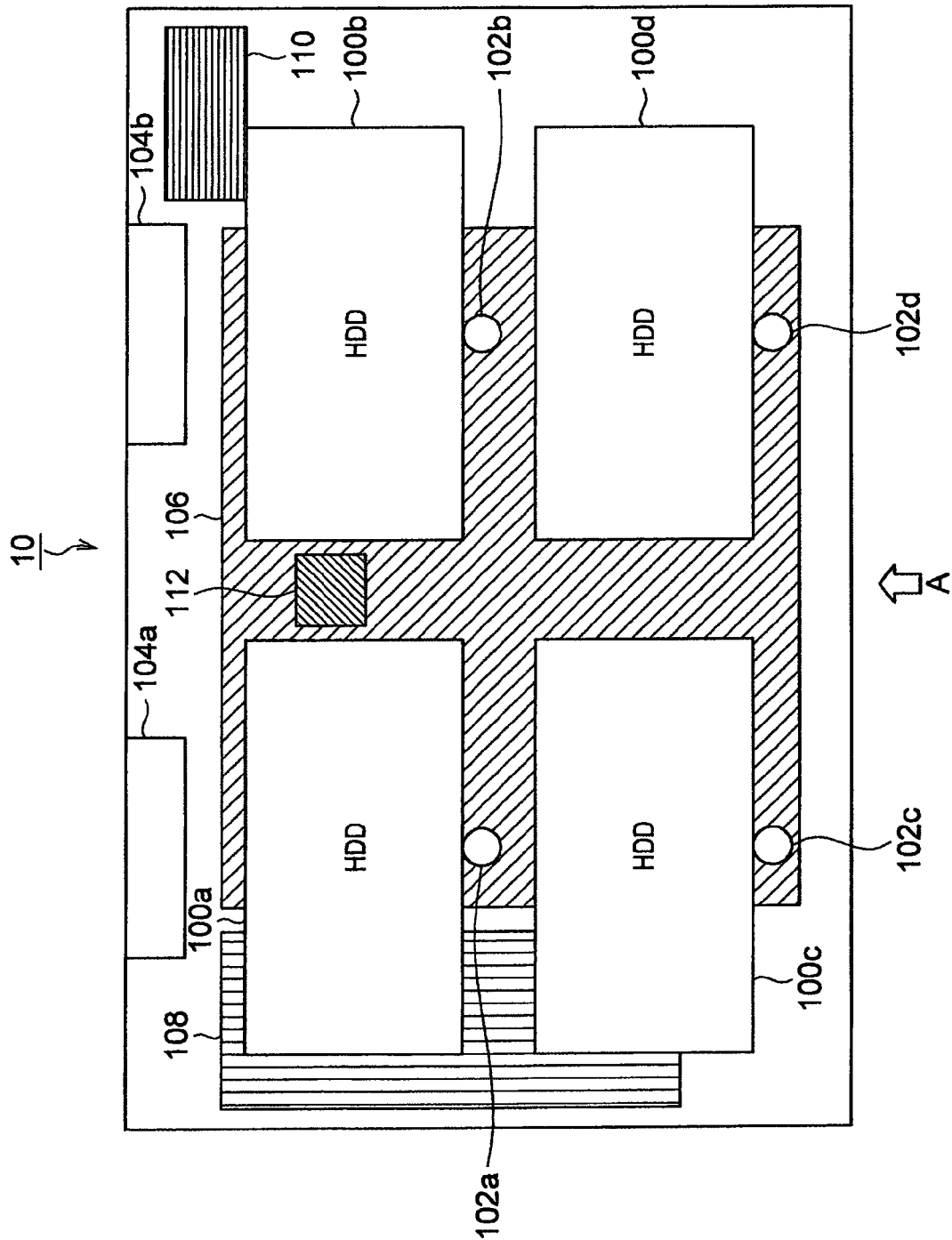
FIG. 2 is an explanatory view showing the hardware configuration of the recording apparatus 10 according to one embodiment of the present invention.
Figure 3:
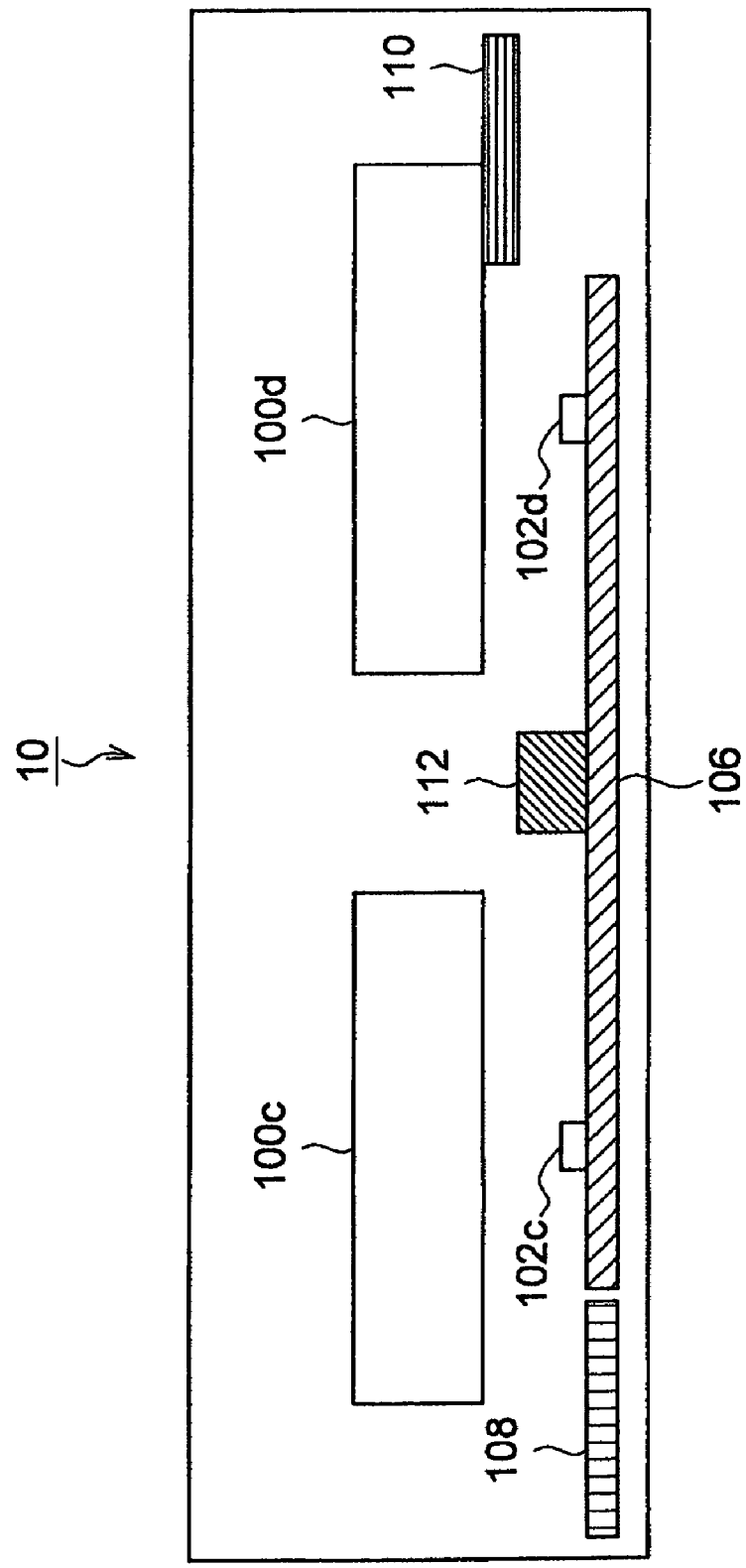
FIG. 3 is an explanatory view showing the hardware configuration of FIG. 2 viewed from a side.

FIG. 2 is an explanatory view showing the hardware configuration of the recording apparatus 10 according to one embodiment of the present invention viewed from above. FIG. 3 is an explanatory view showing the hardware configuration of FIG. 2 viewed from a side. The hardware configuration of the recording apparatus 10 according to one embodiment of the present invention is described hereinafter with reference to FIGS. 2 and 3.

Referring to FIG. 2, the recording apparatus 10 according to one embodiment of the present invention includes hard disk drives (HDD) 100a, 100b, 100c and 100d, temperature sensors 102a, 102b, 102c and 102d, fan motors 104a and 104b, a motherboard 106, a power supply portion 108, a tuner/timer portion 110 and a central processing unit (CPU) 112.

In the hard disk drives 100a, 100b, 100c and 100d, an analog or digital broadcast which is received by the recording apparatus 10 is recorded. The capacities of the hard disk drives 100a, 100b, 100c and 100d may be the same or different. Although the recording apparatus 10 which includes four hard disk drives is described in this embodiment by way of illustration, the recording apparatus according to the present invention is not limited thereto as long as it includes two or more hard disk drives.

The hard disk drives 100a, 100b, 100c and 100d have a standby state and an active state. The standby state is a state where a hard disk drive is not activated, and the active state is a state where a hard disk drive is ready for use. To record data into the hard disk drives 100a, 100b, 100c and 100d, it is necessary to set them into the active state, and a transition from the standby state to the active state takes about several to several tens of seconds.

The temperature sensor 102a detects the ambient temperature of the hard disk drive 100a. Likewise, the temperature sensor 102b, 102c and 102d detect the ambient temperature of the hard disk drives 100b, 100c and 100d, respectively.

The fan motors 104a and 104b bring in outside air to cool the inside of the recording apparatus 10. The fan motors 104a and 104b operate independently of each other and change the rotation speed of motors based on a temperature which is detected by the temperature sensors 102a, 102b, 102c and 102d, thereby appropriately cooling the inside of the recording apparatus 10. A technique of switching the rotation speed of fan motors based on a temperature detected by a plurality of sensors is disclosed in Japanese Unexamined Patent Application Publication No. 2005-222584, for example, and the recording apparatus 10 according to this embodiment changes the rotation speed of motors using such a technique to appropriately cool the inside of the recording apparatus 10.

On the motherboard 106, various kinds of circuits for implementing the operation of the recording apparatus 10 are mounted. The temperature sensors 102a, 102b, 102c and 102d and the CPU 112 are mounted on the motherboard 106.

The power supply portion 108 supplies power to the components inside the recording apparatus 10. Each component of the recording apparatus 10 functions by receiving power from the power supply portion 108.

The tuner/timer portion 110 acquires a video signal and an audio signal from an analog broadcast or a digital broadcast which is received by the recording apparatus 10. The recording apparatus 10 can record a TV program by recording a video signal and an audio signal which are received by the tuner/timer portion 110 into each hard disk drive.

The CPU 112 performs numerical calculation, information processing, device control and so on. For example, the CPU 112 of this embodiment controls the rotation speed of the fan motors 104a and 104b based on the temperatures of the hard disk drives 100a, 100b, 100c and 100d which are detected by the temperature sensors 102a, 102b, 102c and 102d, respectively.

FIG. 3 shows the recording apparatus 10 according to this embodiment viewed in the direction A of FIG. 2. Referring to FIG. 3, the temperature sensors 102c and 102d and the CPU 112 are mounted on the motherboard 106.

The hardware configuration of the recording apparatus 10 according to one embodiment of the present invention is described in the foregoing with reference to FIGS. 2 and 3. In the following, the functional configuration of the recording apparatus 10 according to one embodiment of the present invention is described.

Figure 4:
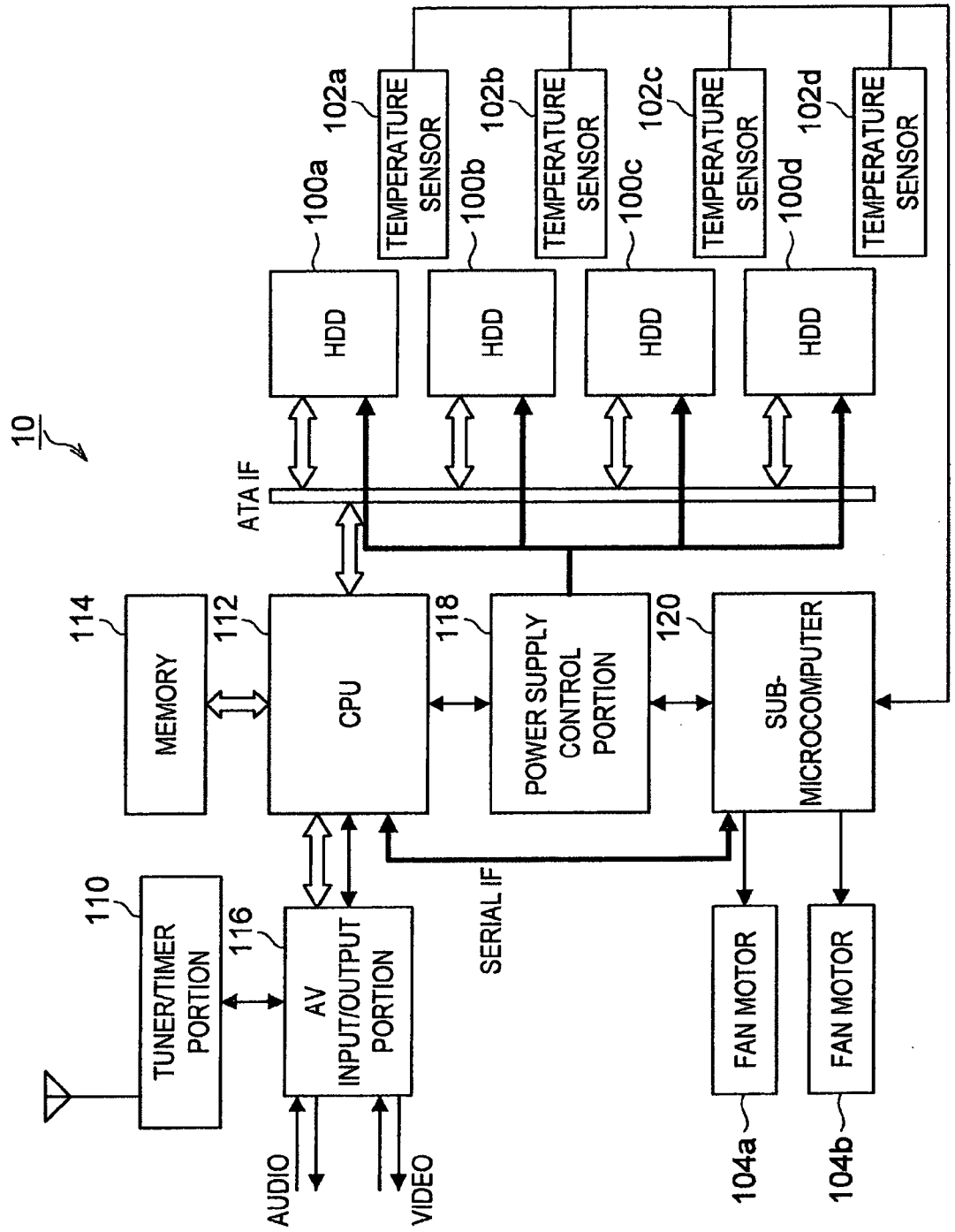
FIG. 4 is an explanatory view showing the functional configuration of the recording apparatus 10 according to one embodiment of the present invention.

FIG. 4 is an explanatory view showing a functional block diagram to describe the functional configuration of the recording apparatus 10 according to one embodiment of the present invention. The functional configuration of the recording apparatus 10 according to one embodiment of the present invention is described hereinafter with reference to FIG. 4.

Referring to FIG. 4, the functional configuration of the recording apparatus 10 according to one embodiment of the present invention includes memory 114, an audio-visual (AV) input/output portion 116, a power supply control portion 118 and a sub-microcomputer 120 in addition to the elements shown in FIGS. 2 and 3. The memory 114, the AV input/output portion 116, the power supply control portion 118 and the sub-microcomputer 120, which are not shown in FIGS. 2 and 3, are described hereinafter in detail.

The memory 114 stores programs and operation parameters to be used by the CPU 112 when performing numerical calculation, information processing, device control, and so on. Read only memory (ROM) and random access memory (RAM) may be used as the memory 114. For example, fixed data of programs and operation parameters which is basically not altered may be stored in ROM. And, data of programs and operation which basically varies during processing may be stored in RAM.

The AV input/output portion 116 inputs and outputs video data and audio data. A program which is recorded in the hard disk drives 100a, 100b, 100c and 100d is read out by the CPU 112, and video data and audio data of the recorded program are output through the AV input/output portion 116. Further, video data and audio data are input through the AV input/output portion 116, and the input video data and audio data are read out by the CPU 112 and recorded into the hard disk drives 100a, 100b, 100c and 100d.

The power supply control portion 118 controls application of power to the hard disk drives 100a, 100b, 100c and 100d. As a result of controlling application of power to the hard disk drives 100a, 100b, 100c and 100d by the power supply control portion 118, the state of each of the hard disk drives 100a, 100b, 100c and 100d changes between standby and active. The way of controlling application of power to the hard disk drives 100a, 100b, 100c and 100d is described in detail later.

The sub-microcomputer 120, which is an example of a drive setting portion of the present invention, receives temperature data of each hard disk drive which is detected by the temperature sensors 102a, 102b, 102c and 102d and, using the received temperature data, controls the rotation speed of the fan motors 104a and 104b and transmits a direction for applying power to the hard disk drives 100a, 100b, 100c and 100d to the power supply portion 108. The way that the sub-microcomputer 120 controls the rotation speed of the fan motors 104a and 104b and transmits a direction for applying power to the hard disk drives 100a, 100b, 100c and 100d to the power supply portion 108 and so on is described in detail later.

The functional configuration of the recording apparatus 10 according to one embodiment of the present invention is described in the foregoing with reference to FIG. 4. In the following, the operation of the recording apparatus 10 according to one embodiment of the present invention is described.

The structure of a hard disk drive which is incorporated in the recording apparatus 10 according to one embodiment of the present invention is described first. FIGS. 5A and 5B are explanatory views showing the structure of a hard disk drive which is incorporated in the recording apparatus 10 according to one embodiment of the present invention. The structure of a hard disk drive which is incorporated in the recording apparatus 10 according to one embodiment of the present invention is described hereinafter with reference to FIGS. 5A and 5B.

Referring to FIGS. 5A and 5B, each of the hard disk drives which are incorporated in the recording apparatus 10 has a storage area and a cache area inside. One of the hard disk drives which are included in the recording apparatus 10 is used as a cache hard disk drive, and the rest of the hard disk drives are used as storage hard disk drives.

Further, it is only one cache hard disk drive or a storage hard disk drive that receives power and gets activated. Thus, power is basically applied to only one hard disk drive to activate it. Even if the recording apparatus 10 includes a plurality of hard disk drives, only one hard disk drive is activated as a general rule, thereby reducing noise, power consumption and temperature increase of the recording apparatus 10.

In the case of manual recording where a user of the recording apparatus 10 manipulates a remote control or a main body for recording, a program is recorded into a cache area of a cache hard disk drive just after the start of recording. Then, while the program is being recorded into the cache area, power is applied to one of the other hard disk drives in the standby state, so that the one hard disk drive changes to the active state.

After the hard disk drive is activated, data is transferred from the cache area of the cache hard disk drive to a storage area of the activated hard disk drive (cf. FIG. 5A). When the transfer is completed, application of power to the cache hard disk drive is stopped, so that the cache hard disk drive changes from the active state to the standby state.

On the other hand, in the case of timer recording where recording is started at a specified time, one hard disk drive to serve as a storage hard disk drive is activated at a specified time, and a program is recorded into a storage area of the activated storage hard disk drive (cf. FIG. 5B).

The structure of hard disk drives which is incorporated in the recording apparatus 10 according to one embodiment of the present invention is described in the foregoing with reference to FIGS. 5A and 5B. In the following, a method of switching hard disk drives which are incorporated in the recording apparatus 10 according to one embodiment of the present invention is described in comparison with a related art.

FIG. 6A shows a method of switching hard disk drives according to a related art. In FIG. 6A, four hard disk drives are referred to as A: to D: drives, respectively, for convenience of description.

In the method of switching hard disk drives according to the related art, one hard disk drive, which is the A: drive in the example of FIG. 6A, is always used as a cache hard disk drive, and the remaining B: to D: drives are used as storage hard disk drives according to need, thereby minimizing a time lag at the start of manual recording. It is therefore necessary to set the A: drive always in the active state.

Before the start of manual recording, only the A: drive is in the active state, and the B: drive, the C: drive and the D: drive are in the standby state (cf. FIG. 6A(a)). When a user starts manual recording, data is temporarily recorded into the A: drive in the active state, and the B: drive, which is one of the hard disk drives in the standby state, is activated (cf. FIG. 6A(b)).

After the activation of the B: drive is completed, the data temporarily recorded in the A: drive is transferred to the B: drive (cf. FIG. 6A(c)). After the transfer is completed, the data temporarily recorded in the A: drive is deleted or invalidated, and subsequent data is recorded into the B: drive (cf. FIG. 6A(d) (e)).

As described above, in the method of switching hard disk drives according to the related art, a plurality of hard disk drives are set to the active state, which causes issues such as noise, high power consumption and temperature increase. In light of this, in a method of switching hard disk drives using the recording apparatus 10 of this embodiment, only one hard disk drive is basically set to the active state, thereby reducing noise, power consumption and temperature increase of the recording apparatus 10.

FIG. 6B is an explanatory view showing the outline of a method of switching hard disk drives using the recording apparatus 10 according to one embodiment of the present invention. In FIG. 6B, four hard disk drives are referred to as A: to D: drives, respectively, for convenience of description.

Before the start of manual recording, only the A: drive is in the active state, and the B: drive, the C: drive and the D: drive are in the standby state (cf. FIG. 6B(a)). When a user starts manual recording, data is temporarily recorded into the A: drive in the active state, and the B: drive, which is one of the hard disk drives in the standby state, is activated (cf. FIG. 6B(b)).

After the activation of the B: drive is completed, the data temporarily recorded in the A: drive is transferred to the B: drive (cf. FIG. 6B(c)). After the transfer is completed, the data temporarily recorded in the A: drive is deleted or invalidated, and subsequent data is recorded into the B: drive (cf. FIG. 6B(d)).

The process up to this point is the same as that of the method of switching hard disk drives according to the related art shown in FIG. 6A. After that, application of power to the A: drive, which has been a cache hard disk drive, is stopped, so that the A: drive changes from the active state to the standby state. Then, the B: drive, where recording is in progress, is set to a hard disk drive which serves both as a storage and a cache (cf. FIG. 6B(e)).

As described above, by basically setting only one hard disk drive to the active state, it is possible to reduce noise, power consumption and temperature increase of the recording apparatus 10.

An outline of the method of switching hard disk drives using the recording apparatus 10 according to one embodiment of the present invention is described in the foregoing with reference to FIG. 6B. In the following, the method of switching hard disk drives using the recording apparatus 10 according to one embodiment of the present invention is described in detail.

FIG. 7 is a flowchart showing a method of switching hard disk drives using the recording apparatus 10 according to one embodiment of the present invention. The method of switching hard disk drives using the recording apparatus 10 according to one embodiment of the present invention is described hereinafter in detail with reference to FIG. 7.

When the main power of the recording apparatus 10 is turned on, the sub-microcomputer 120 acquires the temperature data of the hard disk drives 100a, 100b, 100c and 100d which are respectively detected by the temperature sensors 102a, 102b, 102c and 102d (step S102). After the sub-microcomputer 120 acquires the temperature data, it selects a hard disk drive corresponding to the lowest temperature as a cache hard disk drive (step S104). After the sub-microcomputer 120 selects the hard disk drive to serve as a cache, it directs the power supply control portion 118 to apply power to the selected hard disk drive. Receiving the direction from the sub-microcomputer 120, the power supply control portion 118 applies power to the hard disk drive which is selected by the sub-microcomputer 120 to activate it, so that the hard disk drive changes from the standby state to the active state (step S106).

After that, the recording apparatus 10 waits until a request for manual recording is made by a user (step S108). If a request for manual recording is not made, the recording apparatus 10 repeats the step S108. On the other hand, if a request for manual recording is made, data is recorded into a cache area of the cache hard disk drive (step S110).

Further, the sub-microcomputer 120 acquires the temperature data of the hard disk drives 100a, 100b, 100c and 100d which are respectively detected by the temperature sensors 102a, 102b, 102c and 102d (step S112). After the sub-microcomputer 120 acquires the temperature data, it selects a hard disk drive corresponding to the lowest temperature at the time of acquisition as a storage hard disk drive (step S114). The cache hard disk drive and the storage hard disk drive may be the same hard disk. After the sub-microcomputer 120 selects the hard disk drive to serve as a storage hard disk drive, it directs the power supply control portion 118 to apply power to the selected hard disk drive. Receiving the direction from the sub-microcomputer 120, the power supply control portion 118 applies power to the hard disk drive which is selected by the sub-microcomputer 120 to activate it, so that the hard disk drive changes from the standby state to the active state (step S116).

After the activation of the storage hard disk drive is completed in the step S116, the CPU 112 transfers the data which is recorded in the cache area of the cache hard disk drive into the storage area of the storage hard disk drive. Then, a subsequent part of the data which is recorded in the cache hard disk drive is recorded into the storage area of the storage hard disk drive (step S118).

After the transfer of data from the cache hard disk drive to the storage hard disk drive is completed, the CPU 112 deletes or invalidates the data which is recorded in the cache area of the cache hard disk drive. Then, the power supply control portion 118 stops applying power to the cache hard disk drive, thereby setting the cache hard disk drive to the standby state (step S120).

After the power supply control portion 118 sets the cache hard disk drive to the standby state, the hard disk drive which is selected as a storage hard disk drive in the step S114 is set to a cache and storage hard disk drive (step S122). Then, data is recorded into the cache and storage hard disk drive (step S124).

When the recording to the cache and storage hard disk drive is completed, the sub-microcomputer 120 acquires the temperature data of the hard disk drives 100a, 100b, 100c and 100d which are respectively detected by the temperature sensors 102a, 102b, 102c and 102d upon completion of the recording to the hard disk drive (step S126). After the sub-microcomputer 120 acquires the temperature data, it selects a hard disk drive corresponding to the lowest temperature as a cache hard disk drive (step S128). The hard disk drive which stores the program and the cache hard disk drive may be the same.

After the sub-microcomputer 120 selects the hard disk drive to serve as a cache, it directs the power supply control portion 118 to apply power to the selected hard disk drive. Receiving the direction from the sub-microcomputer 120, the power supply control portion 118 applies power to the hard disk drive which is selected by the sub-microcomputer 120 to activate it, so that the hard disk drive changes from the standby state to the active state (step S130). After the hard disk drive changes to the active state, the power supply control portion 118 stops applying power to the hard disk drive which has been set to a storage hard disk drive, thereby changing the hard disk drive which has been a storage hard disk drive from the active state to the standby state (step S132).

After changing the hard disk drive which has been set to a storage hard disk drive from the active state to the standby state, the hard disk drive which is selected as a cache hard disk drive in the step S128 is set to a cache and storage hard disk drive (step S134).

Then, it is determined if a user manipulates a remote control or a main body of the recording apparatus 10 to turn the power off (step S136). If the power is turned off, the process ends. On the other hand, if the power is not turned off, the process returns to the step S108 and waits until a request for manual recording is made by a user.

In this manner, it is possible to suppress an increase in the temperature of the recording apparatus 10 by controlling application of power to switch a cache hard disk drive and a storage hard disk drive as appropriate and set only one hard disk drive at a low temperature to the active state.

In the foregoing, the method of switching hard disk drives using the recording apparatus 10 according to one embodiment of the present invention is described in detail with reference to FIG. 7.

The above-described method of switching hard disk drives using the recording apparatus 10 according to one embodiment of the present invention may be implemented by storing a computer program which is programmed to execute a series of processing described above inside the recording apparatus 10 (e.g. in the sub-microcomputer 120 or the memory 114) and sequentially reading out the computer program by the CPU 112.

As described in the foregoing, in the recording apparatus 10 according to one embodiment of the present invention, each of a plurality of hard disk drives has a cache area and a storage area, and basically only one hard disk drive is set to the active state, thereby reducing noise, power consumption and temperature increase of the recording apparatus 10.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, although a hard disk drive corresponding to the second lowest temperature is selected as a storage hard disk drive in the step S114 of FIG. 7 in the embodiment described above, the present invention is not limited thereto. For example, if a hard disk drive at a lower temperature than a cache hard disk drive exists, the hard disk drive may be selected as a storage hard disk drive in the step S114 of FIG. 7.

What is claimed is:

1. An electronic apparatus including a plurality of hard disk drives having a standby state and an active state as power application state, comprising:
    a drive setting portion to set each of the plurality of hard disk drives to a cache hard disk drive or a storage hard disk drive so as to use one hard disk drive in the active state as a cache hard disk drive and use a remaining hard disk drive as a storage hard disk drive;
    a power control portion to control application of power to each of the hard disk drives according to setting by the drive setting portion; and
    a temperature measuring portion to measure a temperature of each of the plurality of hard disk drives,
    wherein during operation the drive setting portion sets a hard disk drive among the plurality of hard disk drives at a lowest temperature measured at a first time by the temperature measuring portion to a cache hard disk drive and sets a hard disk drive among the plurality of hard disk drives including the hard disk drive set to the cache hard disk drive at a second lowest temperature measured at a second time after the first time by the temperature measuring portion to a storage hard disk drive.

2. The electronic apparatus according to claim 1, wherein
    the drive setting portion sets the hard disk drive at the lowest temperature measured by the temperature measuring portion to the cache hard disk drive upon completion of recording of data into the storage hard disk drive.

3. A disk switching method of an apparatus including a plurality of hard disk drives having a standby state and an active state as power application state, comprising the steps of:
    setting each of the plurality of hard disk drives to a cache hard disk drive or a storage hard disk drive so as to use one hard disk drive in the active state as a cache hard disk drive and use a remaining hard disk drive as a storage hard disk drive; and
    controlling application of power to each of the hard disk drives according to setting in the setting step; and
    measuring a temperature of each of the plurality of hard disk drives,
    wherein the setting step sets a hard disk drive among the plurality of hard disk drives at a lowest temperature measured at first time in the measuring step to a cache hard disk drive and sets a hard disk drive among the plurality of hard disk drives including the hard disk drive set to the cache hard disk drive at a second lowest temperature measured at a second time after the first time in the measuring step to a storage hard disk drive.

4. The disk switching method according to claim 3, wherein
    the setting step sets the hard disk drive at the lowest temperature measured in the measuring step to the cache hard disk drive upon completion of recording of data into the storage hard disk drive.

5. A non-transitory computer readable memory having stored thereon a computer program for switching disks in an apparatus including a plurality of hard disk drives having a standby state and an active state as power application state, the computer program causing a computer to execute processing comprising:

setting each of the plurality of hard disk drives to a cache hard disk drive or a storage hard disk drive so as to use one hard disk drive in the active state as a cache hard disk drive and use a remaining hard disk drive as a storage hard disk drive;

controlling application of power to each of the hard disk drives according to setting in the setting step; and measuring a temperature of each of the plurality of hard disk drives, wherein the setting step sets a hard disk drive among the plurality of hard disk drives at a lowest temperature measured at a first time in the measuring step to a cache hard disk drive and sets a hard disk drive among the plurality of hard disk drives including the hard disk drive set to the cache hard disk drive at a second lowest temperature measured at a second time after the first time in the measuring step to a storage hard disk drive.

* * * * *